United States Patent
Hosoki

(10) Patent No.: US 8,305,335 B2
(45) Date of Patent: Nov. 6, 2012

(54) BACKLIGHT LAMP LIGHTING CONTROL DEVICE AND DISPLAY DEVICE INCLUDING SAME

(75) Inventor: Mitsuru Hosoki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 303 days.

(21) Appl. No.: 12/451,224

(22) PCT Filed: Feb. 14, 2008

(86) PCT No.: PCT/JP2008/052436
§ 371 (c)(1),
(2), (4) Date: Nov. 2, 2009

(87) PCT Pub. No.: WO2008/149582
PCT Pub. Date: Dec. 11, 2008

(65) Prior Publication Data
US 2010/0214207 A1    Aug. 26, 2010

(30) Foreign Application Priority Data
Jun. 5, 2007 (JP) .................................. 2007-149594

(51) Int. Cl.
*G09G 3/36* (2006.01)
(52) U.S. Cl. ........................... 345/102; 345/77; 345/211
(58) Field of Classification Search .................... 345/38, 345/98, 101, 102, 204, 211; 363/97, 131–134
See application file for complete search history.

(56) References Cited

U.S. PATENT DOCUMENTS

| | | | | |
|---|---|---|---|---|
| 6,044,003 A * | 3/2000 | Toshinari et al. | ............... | 363/97 |
| 7,394,209 B2 * | 7/2008 | Lin et al. | ........................ | 315/247 |
| 7,459,865 B2 * | 12/2008 | Honbo | .......................... | 315/291 |
| 7,864,155 B2 * | 1/2011 | Kawaguchi | .................... | 345/102 |
| 2005/0140640 A1 * | 6/2005 | Oh et al. | ........................ | 345/102 |

FOREIGN PATENT DOCUMENTS

| | | |
|---|---|---|
| JP | 10-112396 | 4/1998 |
| JP | 2000-58289 | 2/2000 |
| JP | 2002-56996 | 2/2002 |
| JP | 2002-158097 | 5/2002 |
| JP | 2006-278289 | 10/2006 |

* cited by examiner

Primary Examiner — Amare Mengistu
Assistant Examiner — Stacy Khoo
(74) Attorney, Agent, or Firm — Harness, Dickey & Pierce, P.L.C.

(57) ABSTRACT

One embodiment of the present invention discloses: a backlight lamp lighting control device including: a PWM signal generating section for generating a PWM signal in accordance with a duty ratio externally inputted, and outputting the PWM signal to a PWM inverter section controlled by the PWM signal so as to drive a fluorescent lamp to light; and a tube current detecting section for detecting a current flowing in the fluorescent lamp, the PWM signal generating section generating the PWM signal based on a current, which is obtained by adjusting the current detected by the tube current detecting section in accordance with the duty ratio externally inputted, so that luminance displayed on a liquid crystal display panel will be substantially uniform over the entire liquid crystal display panel.

7 Claims, 13 Drawing Sheets

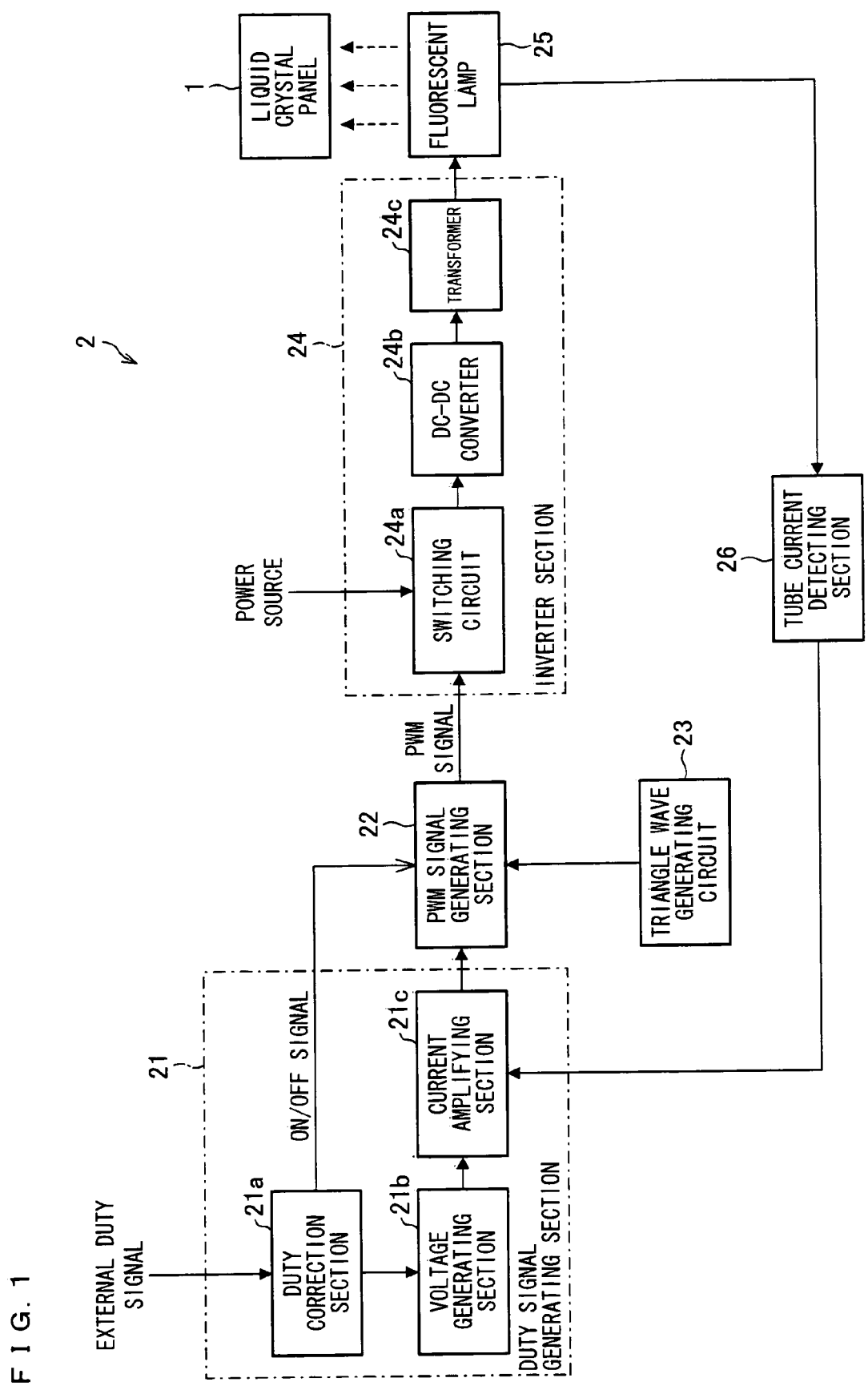
F I G. 1

F I G. 9

| EXTERNAL DUTY RATIO | LUMINANCE | CORRECTION DUTY RATIO | TUBE CURRENT |
|---|---|---|---|
| 100% | 100% | 100% | 5.5mA |
| ⋮ | ⋮ | ⋮ | ⋮ |
| 67% | 67% | 57% | 6.0mA |
| ⋮ | ⋮ | ⋮ | ⋮ |
| 50% | 50% | 36% | 6.5mA |
| ⋮ | ⋮ | ⋮ | ⋮ |

DUTY RATIO (%)

US 8,305,335 B2

BACKLIGHT LAMP LIGHTING CONTROL DEVICE AND DISPLAY DEVICE INCLUDING SAME

TECHNICAL FIELD

The present invention relates to a PWM (Pulse Width Modulation) backlight lamp lighting control device, which is applicable to a liquid crystal display device or the like.

BACKGROUND ART

In recent years, a plate display device has been widely applied in a display device field. This is because a recent plate display device can be manufactured small and/or thin easily. Since a liquid crystal display (LCD) device can easily realize multicolor display, the LCD device is often used as such a plate display. A transmissive LCD device generally includes a backlight device so as to ensure luminance of a display surface. Further, a transflective LCD device, which has functions of both a reflective LCD device and a transmissive LCD device, also includes a backlight device as a light source for a transmissive mode.

Such a backlight device has a function of adjusting luminance (i.e. light control function), so as to improve quality of a display screen, or suppress electric power consumption in driving a display device with a battery. A cold cathode florescent tube (hereinafter, referred to as "fluorescent lamp") is generally used as a light source of the backlight. There have been known, for example, the following light control methods for the backlight using a cold cathode fluorescent lamp: (i) a pulse width modulation (PWM) light control method in which a pulse width of a pulse voltage which is applied at a certain cycle is controlled; and (ii) a tube current light control method in which a current flowing in a florescent lamp is controlled.

In recent years, a backlight device adopting both the aforementioned light control methods has been proposed. For example, Patent Literature 1 discloses a technique of controlling light in such a manner that (i) in a low luminance region, light is controlled by only the pulse width modulation, while a tube current is maintained at a certain value, and (ii) in a high luminance region, in which the pulse width exhibits a duty ratio of not less than 100%, light is controlled by adjusting the tube current. FIG. 15 is a graph showing a change in luminance in a backlight device disclosed in Patent Literature 1. With the arrangement, in the high luminance region, it is possible to change the tube current in a range from a minimum value to a maximum value while the pulse width is maintained at a duty ratio of 100%. Therefore, it is possible to control light in a wider range.

CITATION LIST

Patent Literature 1

Japanese Patent Application Publication, Tokukai, No. 2002-56996 A (Publication Date: Feb. 22, 2002)

SUMMARY OF INVENTION

Technical Problem

Meanwhile, a fluorescent lamp used as a light source of a backlight generates a luminance difference between a high voltage side and a low voltage side. FIG. 2 is a view schematically illustrating an arrangement of a fluorescent lamp, and FIG. 3 is a graph showing a relationship between a position in the fluorescent lamp and a tube current. As illustrated in FIG. 2, a power source is connected to one end (the high voltage side; the left side in FIG. 2) of the fluorescent lamp, and the tube current flows from the one end toward the other end (the low voltage side; the right side in FIG. 2) of the fluorescent lamp.

Here, the fluorescent lamp has a long and thin shape in accordance with a shape of a display panel. Therefore, as shown in FIG. 3, the current flowing in the florescent lamp gradually becomes less, due to leakage to a substrate connected to the fluorescent lamp, or the like, as the current flows from the one end to the other end. This generates a difference between a luminance displayed on the high voltage side and a luminance displayed on the low voltage side. As a result, non-uniform display is caused over an entire display screen. It has been known that this luminance difference becomes greater when light of the fluorescent lamp is controlled to be less.

FIG. 4 is a graph showing a relationship between a position in the fluorescent lamp and a luminance ratio, where the duty ratio is changed. FIG. 4 is the graph showing relative luminances, where a luminance at a center position of the fluorescent lamp is set to be a reference value "1". As shown in FIG. 4, in a case where the duty ratio is 100%, a luminance on the high voltage side is 1.4 times more than the luminance at the center position. On the other hand, in a case where the duty ratio is adjusted down to be 25%, the luminance on the high voltage side is 2.2 times more than the luminance at the center position.

FIG. 7 is a graph showing a relationship between a duty ratio and a luminance ratio (the luminance H on the high voltage side/the luminance L on the low voltage side). As is clear from this graph, the less the duty ratio becomes, the greater a difference between the luminance on the high voltage side and the luminance on the low voltage side becomes.

As described above, it can be seen that a fluorescent lamp of a backlight is such that the luminance difference becomes greater as being closer to the high voltage side, and also the luminance difference becomes greater as the duty ratio becomes less. This causes non-uniform display over the entire display screen.

Meanwhile, the backlight device disclosed in Patent Literature 1 controls light, in the low luminance region where the duty ratio is not more than 100%, by only changing the duty ratio while maintaining the tube current at a certain value. Accordingly, with the backlight device disclosed in Patent Literature 1, it is difficult to solve the problem of non-uniform display caused due to the luminance difference described above.

The present invention is made in view of the problem. An object of the present invention is to provide a backlight lamp lighting control device which reduces a difference between a luminance on a high voltage side of a lamp for a backlight, and a luminance on a low voltage side of the lamp so that luminance displayed on a display screen will be substantially uniform over the entire display screen.

In order to attain the object, a backlight lamp lighting control device of the present invention includes: a PWM signal generating section for generating a PWM signal in accordance with a duty ratio externally inputted, and outputting the PWM signal to a PWM inverter for driving a lamp to light; and a tube current detecting section for detecting a current flowing in the lamp, and the PWM signal generating section generates the PWM signal based on a current, which is obtained by adjusting the current detected by the tube current detecting section in accordance with the duty ratio externally inputted, so that luminance displayed on a display panel will be substantially uniform over the entire display panel.

Generally, a lamp has a characteristic that a luminance difference generated in the lamp can be reduced by increasing a current flowing in the lamp. Further, it has been known that the luminance difference becomes greater as the duty ratio becomes smaller. Here, in a conventional backlight device, in a region where the duty ratio is not more than 100%, light is controlled by changing the duty ratio while maintaining the current flowing in the lamp at a certain value.

On the other hand, with the arrangement of the present invention, the current used to generate the PWM signal is adjusted in accordance with the duty ratio externally inputted, so that the luminance displayed on the display panel is substantially uniform over the entire display panel. Therefore, for example, it is possible to increase the current flowing in the lamp when the duty ratio is reduced. Accordingly, as compared with the conventional arrangement, it is possible to reduce the luminance difference generated in the lamp.

Thus, the current flowing in the lamp can be adjusted in accordance with a change in duty ratio, so that it is possible to realize uniform luminance over the entire display screen by reducing the luminance difference generated in the lamp.

Further, the backlight lamp lighting control device preferably further includes a duty correction section for correcting the duty ratio externally inputted, in accordance with the current thus adjusted, so that the luminance displayed on the display panel will be identical with luminance corresponding to the duty ratio externally inputted, and the PWM signal is generated based on the current thus adjusted and the duty ratio thus corrected.

Here, in a case where the current flowing in the lamp is increased, it is possible to reduce the luminance difference generated in the lamp. In this case, however, the luminance displayed on the display panel also becomes greater. This causes the display to become brighter than target display.

With the arrangement, the external duty ratio is corrected in accordance with a change in the current, so that the luminance displayed on the display panel is identical with the luminance corresponding to the duty ratio externally inputted. Specifically, for example, in a case where the duty ratio externally inputted is small, the current flowing in the lamp is increased and simultaneously the duty ratio is corrected into a smaller value than that of the duty ratio externally inputted. Accordingly, by generating the PWM signal based on the current thus adjusted and the duty ratio thus corrected, it is possible to (i) reduce the luminance difference generated in the lamp, and simultaneously (ii) display the target luminance.

Note that the current thus adjusted and the duty ratio thus corrected are preferably set so that a degree that the luminance difference of the lamp is increased by reducing the duty ratio, is less than a degree that the luminance difference of the lamp is reduced by increasing the current. This makes it possible to successfully (i) reduce the luminance difference generated in the lamp, and simultaneously (ii) display the target luminance.

Further, the backlight lamp lighting control device preferably further includes: a voltage generating section for outputting a desired voltage in accordance with the duty ratio externally inputted; and a current amplifying section for (i) amplifying the current detected by the tube current detecting section, based on the voltage outputted from the voltage generating section, and (ii) outputting the current thus amplified, to the PWM signal generating section.

With the arrangement, it is possible to generate a desired current for generating the PWM signal, in accordance with the duty ratio externally inputted.

Furthermore, in the backlight lamp lighting control device, the duty correction section preferably stores a table in which currents thus adjusted and duty ratios thus corrected are associated with each other in advance, and the table is preferably looked up to cause the luminance displayed on the display panel to be identical with the luminance corresponding to the duty ratio externally inputted.

Moreover, in the backlight lamp lighting control device, the duty correction section preferably looks up the table so as to determine a duty ratio corresponding to the duty ratio externally inputted, as the duty ratio thus corrected.

With the arrangement, by looking up the table, it is possible to easily determine the duty ratio thus corrected and the current thus adjusted, both of which correspond to the duty ratio externally inputted.

Further, the backlight lamp lighting control device preferably further includes: a voltage generating section for (i) generating a voltage in accordance with the duty ratio thus corrected, which is determined in accordance with the duty ratio externally inputted by looking up the table, and (ii) outputting the voltage, wherein the voltage is a voltage for amplifying the current detected by the tube current detecting section to the current thus adjusted; and a current amplifying section for (i) amplifying the current detected by the tube current detecting section to the current thus adjusted, based on the voltage outputted from the voltage generating section, and (ii) outputting to the PWM signal generating section the current thus adjusted.

With the arrangement, it is possible to determine a desired duty ratio and a desired current, in accordance with the duty ratio externally inputted. By use of these duty ratio and current thus determined, it is possible to generate the PWM signal for displaying the target luminance.

A display device of the present invention includes a display panel, and a backlight device for emitting light toward the display panel, and the backlight device including any one of the backlight lamp lighting control devices described above.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a block diagram schematically illustrating an arrangement of a display device in accordance with an embodiment of the present invention.

FIG. 9 is a view illustrating an example of a table in which external duty ratios, correction duty ratios, and current values are associated with each other, respectively.

REFERENCE SIGNS LIST

Figure 2:
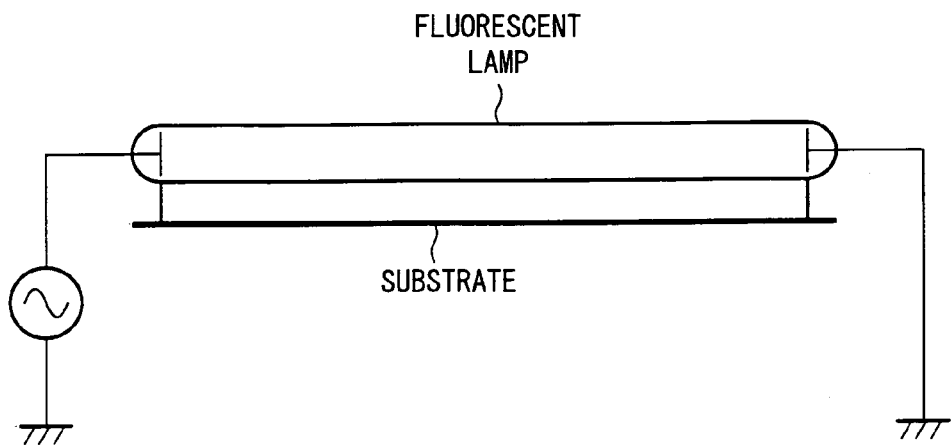
FIG. 2 is a view schematically illustrating an arrangement of a fluorescent lamp.
Figure 3:
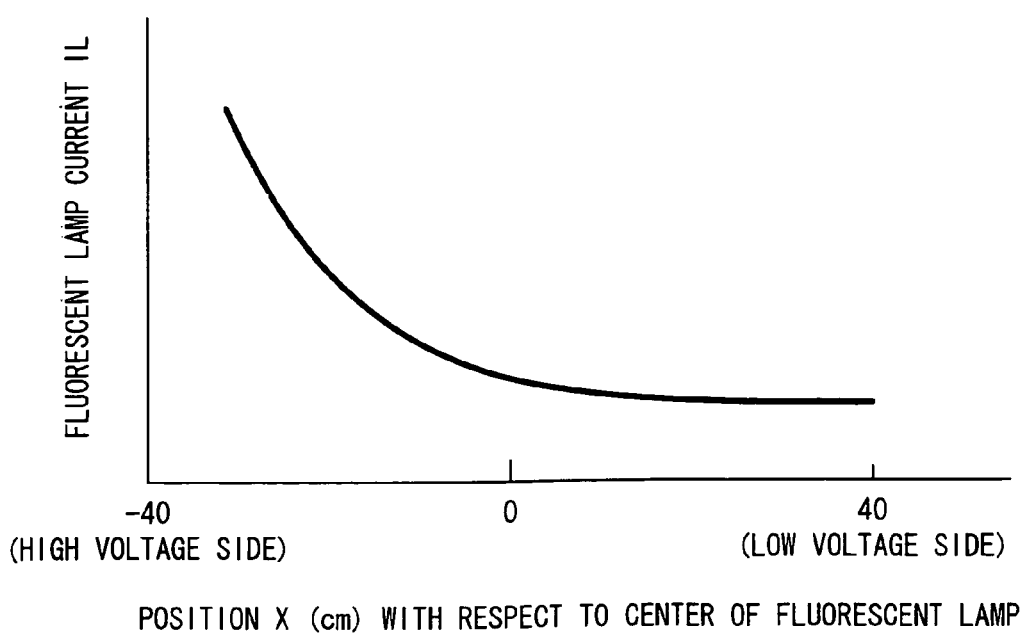
FIG. 3 is a graph showing a relationship between a position in the fluorescent lamp and a tube current.
Figure 4:
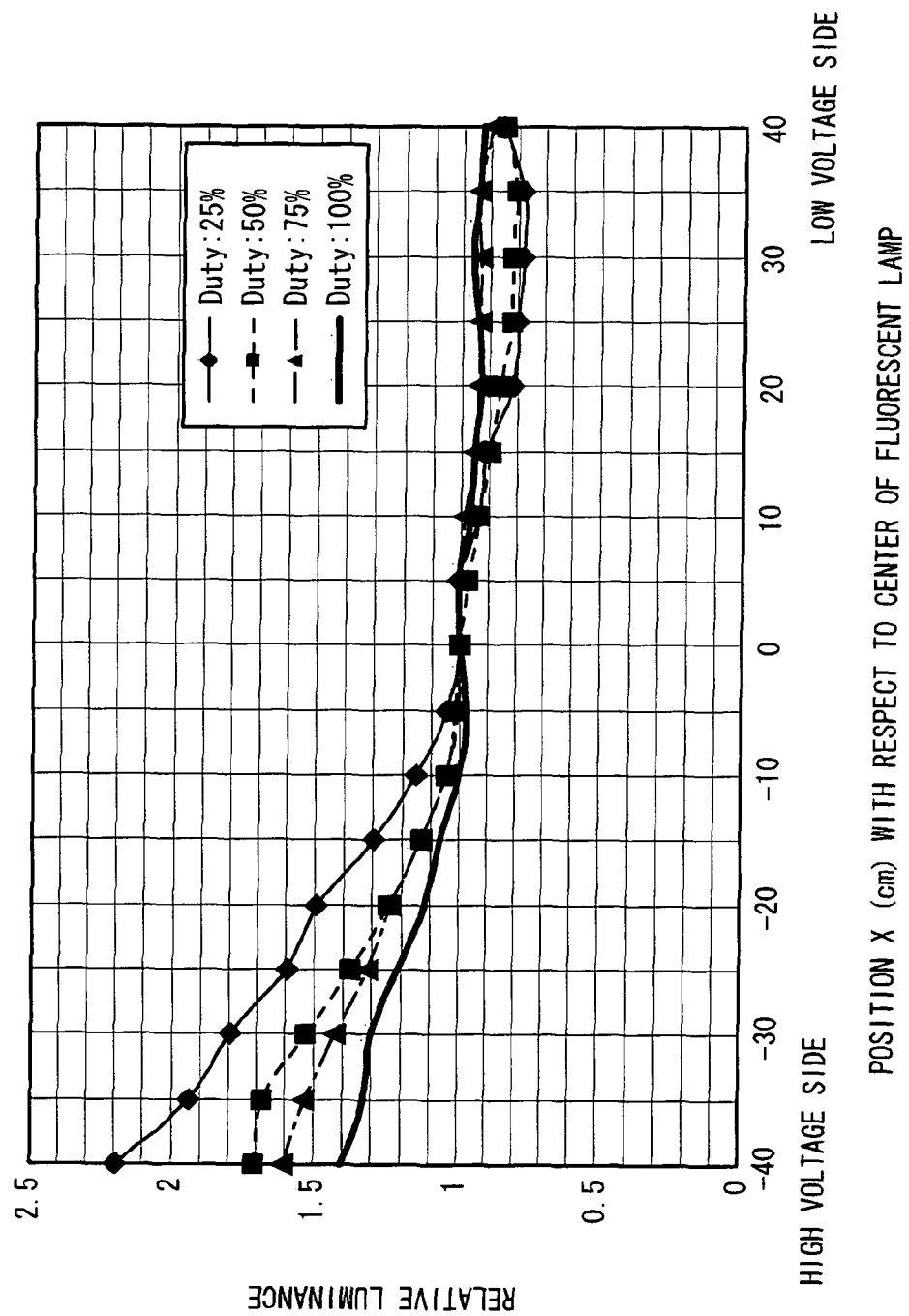
FIG. 4 is a graph showing a relationship between a position in the fluorescent lamp and a luminance ratio, in a case where light is controlled.

1. LIQUID CRYSTAL PANEL (DISPLAY PANEL)
2. BACKLIGHT DEVICE
21. DUTY SIGNAL GENERATING SECTION
21a. DUTY CORRECTION SECTION
21b. VOLTAGE GENERATING SECTION
21c. CURRENT AMPLIFYING SECTION
22. PWM SIGNAL GENERATING SECTION
23. TRIANGLE WAVE GENERATING CIRCUIT
24. INVERTER SECTION (INVERTER)
24a. SWITCHING CIRCUIT
24b. DC-DC CONVERTER
24c. TRANSFORMER
25. FLUORESCENT LAMP (LAMP)
26. TUBE CURRENT DETECTING SECTION

DESCRIPTION OF EMBODIMENTS

One embodiment of the present invention is described below with reference to FIGS. 1 through 14.

A display device of the present embodiment includes a liquid crystal panel (display panel) 1 and a backlight device 2, as illustrated in FIG. 1. The liquid crystal panel 1 includes a main panel section (not illustrated) which is manufactured such that a pair of transparent substrates, to which electrodes for driving liquid crystal are provided, is attached to each other so that the liquid crystal is held between the pair of transparent substrates. This main panel section includes driving ICs which generate various signals for driving the liquid crystal. The backlight device 2 is a lighting device for emitting light from a backside surface of the liquid crystal panel 1. The backlight device 2 is combined with the liquid crystal panel 1, so as to constitute a liquid crystal module.

The backlight device 2 includes a duty signal generating section 21, a PWM signal generating section 22, a triangle wave generating circuit 23, an inverter section 24, a fluorescent lamp 25, and a tube current detecting section 26.

The duty signal generating section 21 (i) adjusts a current (tube current) flowing in the fluorescent lamp 25, which current is detected by the tube current detecting section 26, to a current in accordance with a duty signal externally inputted (hereinafter, referred to as "external duty signal" or "external duty ratio"), and (ii) outputs the current thus adjusted, to the PWM signal generating section 22. The duty signal generating section 21 includes: a duty correction section 21a for correcting an external duty ratio into a desired duty ratio; a voltage generating section 21b for generating a voltage in accordance with the duty ratio thus corrected; and a current amplifying section 21c for amplifying the current flowing in the fluorescent lamp 25, based on the voltage outputted from the voltage generating section 21b. Details of the duty signal generating section 21 will be described later.

The PWM signal generating section 22 generates a PWM signal, based on: the current generated by the duty signal generating section 21; an ON/OFF signal corresponding to the duty ratio corrected by the duty correction section 21a; and a triangle wave signal received from the triangle wave generating circuit 23. The PWM signal generating section 22 outputs the PWM signal to the inverter section 24.

The inverter section 24 includes a switching circuit 24a, a DC-DC converter 24b, and a transformer 24c.

The switching circuit 24a generates a high-frequency voltage by the PWM signal received from the PWM signal generating section 22. The DC-DC converter 24b converts the high-frequency voltage into a desired voltage, and then the transformer 24c boosts the voltage thus converted, and supplies the fluorescent lamp 25 with the voltage thus boosted. The switching circuit 24a turns its output on or off by a power supply externally supplied.

An arrangement of the triangle wave generating circuit 23 is the same as a conventional arrangement. The triangle wave generating circuit 23 is constituted by a comparator IC and an operational amplifier IC, and generates a triangle wave signal, which is compared with the current flowing in the fluorescent lamp 25 when the PWM signal is generated.

The fluorescent lamp 25, which is a light source for the backlight, is provided as a member of a backlight unit (not illustrated). In addition to the fluorescent lamp 25, this backlight unit includes a light guiding plate, a reflecting plate, and a diffusing plate. The light guiding plate is a plate member made from acrylic or the like, which is a transparent material, and functions as a surface light source emitting the light from the fluorescent lamp 25 toward the liquid crystal panel 1. The reflecting plate is attached to a backside surface (on an opposite side of the liquid crystal panel 1) of the light guiding plate, and the diffusing plate is attached to a front surface (on the liquid crystal panel 1 side) of the light guiding plate. The light guiding plate is attached with the reflecting plate so as to successfully reflect light emitted toward the backside surface side to the liquid crystal panel 1 side. Thereby, the light guiding plate improves efficiency of the backlight unit as a surface light source. Further, the light guiding plate is attached with the diffusing plate so as to diffuse the light emitted toward the liquid crystal panel 1. Thereby, the light guiding plate reduces non-uniformity of luminance of the liquid crystal panel 1. Note that the backlight unit may include a prism sheet (not illustrated) between the diffusing plate and the liquid crystal panel 1, if necessary, so as to improve light condensing efficiency. In a case of a direct backlight in which a plurality of fluorescent lamps are provided below the diffusing plate, the backlight unit may include no light guiding plate.

The tube current detecting section 26 is a circuit for detecting a tube current flowing in the fluorescent lamp 25, and detects the tube current by detecting voltages which are generated at both ends of a resistor for detecting the tube current. The tube current detecting section 26 inputs the current thus detected into the current amplifying section 21c of the duty signal generating section 21.

With the arrangement described above, the display device of the present embodiment (i) amplifies the tube current detected by the tube current detecting section 26, in accordance with the external duty ratio, and (ii) drives the inverter section 24 by the PWM signal generated based on the current thus amplified.

Here, the following description schematically explains a problem of a luminance difference of the fluorescent lamp 25.

As described above with reference to FIGS. 2 through 4, luminance of a fluorescent lamp differs depending on a position in the fluorescent lamp. Particularly, the luminance tends to become greater on a high voltage side (power source side). This causes a significant luminance difference between the high voltage side and a low voltage side. Further, this luminance difference tends to become greater, as the light is controlled to be less, that is, as the duty ratio is caused to be smaller (see FIG. 7). Therefore, in the liquid crystal panel 1, display is brighter on the high voltage side than on the low voltage side. As a result, brightness differs between a right side and a left side on a display screen, and non-uniform brightness is caused over the entire display screen. Particularly, in a case where dark display is set, this non-uniformity of the display becomes significant.

Figure 5:
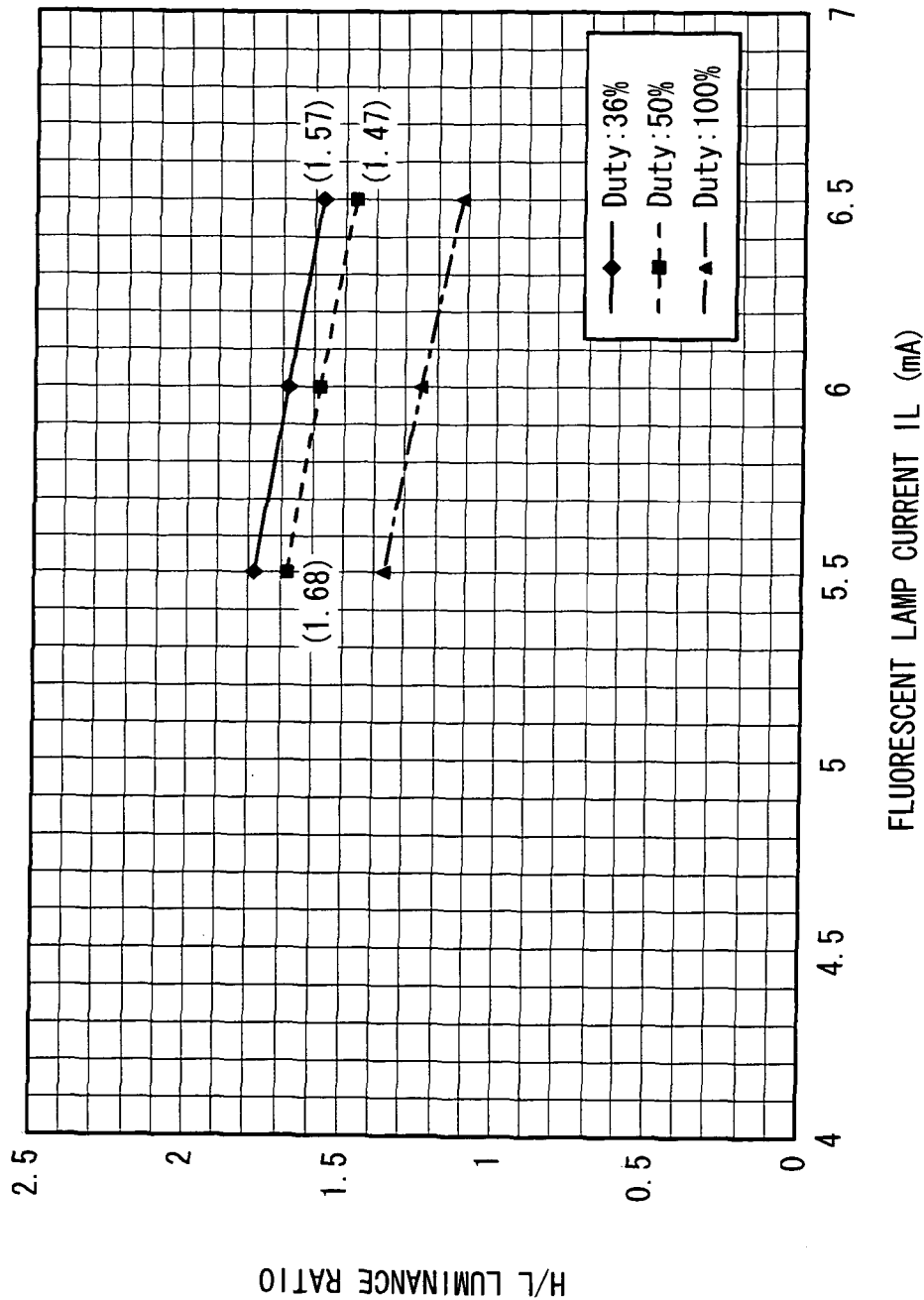
FIG. 5 is a graph showing a relationship between the tube current, and a ratio of a luminance on a high voltage side to a luminance on a low voltage side (H/L luminance ratio), in each of cases where (i) the duty ratio is 100%, (ii) the duty ratio is 50%, and (iii) the duty ratio is 36%.

Such a luminance difference of the fluorescent lamp 25 can be reduced by, for example, a method of increasing a value of the current (tube current) flowing in the fluorescent lamp 25. FIG. 5 is a graph showing a relationship between the tube current, and a ratio of a luminance on the high voltage side to a luminance on the low voltage side (the luminance on the high voltage side/the luminance on the low voltage side: hereinafter, referred to as "H/L luminance ratio"), in each of cases where (i) the duty ratio is 100%, (ii) the duty ratio is 50%, and (iii) the duty ratio is 36%. From FIG. 5, it can be seen that the greater the value of the tube current becomes, the less the H/L luminance ratio becomes. Therefore, the non-uniformity of the display can be improved by increasing the value of the tube current.

However, if the value of the tube current flowing in the fluorescent lamp 25 is increased, the luminance becomes greater, too. As a result, the display becomes brighter than target display. Further, if the value of the tube current is excessively increased in a high luminance region, a large load is generated on the fluorescent lamp 25. This causes a problem that a lifetime of the fluorescent lamp 25 is reduced.

Therefore, the display device of the present embodiment has such an arrangement that, in order to cancel an increase in luminance due to the increase in the value of the tube current flowing in the fluorescent lamp 25, (i) the duty ratio is reduced, and simultaneously, (ii) the value of the tube current is more increased on a low luminance region side where the H/L luminance ratio is large. The following description deals with details of this arrangement.

Figure 6:
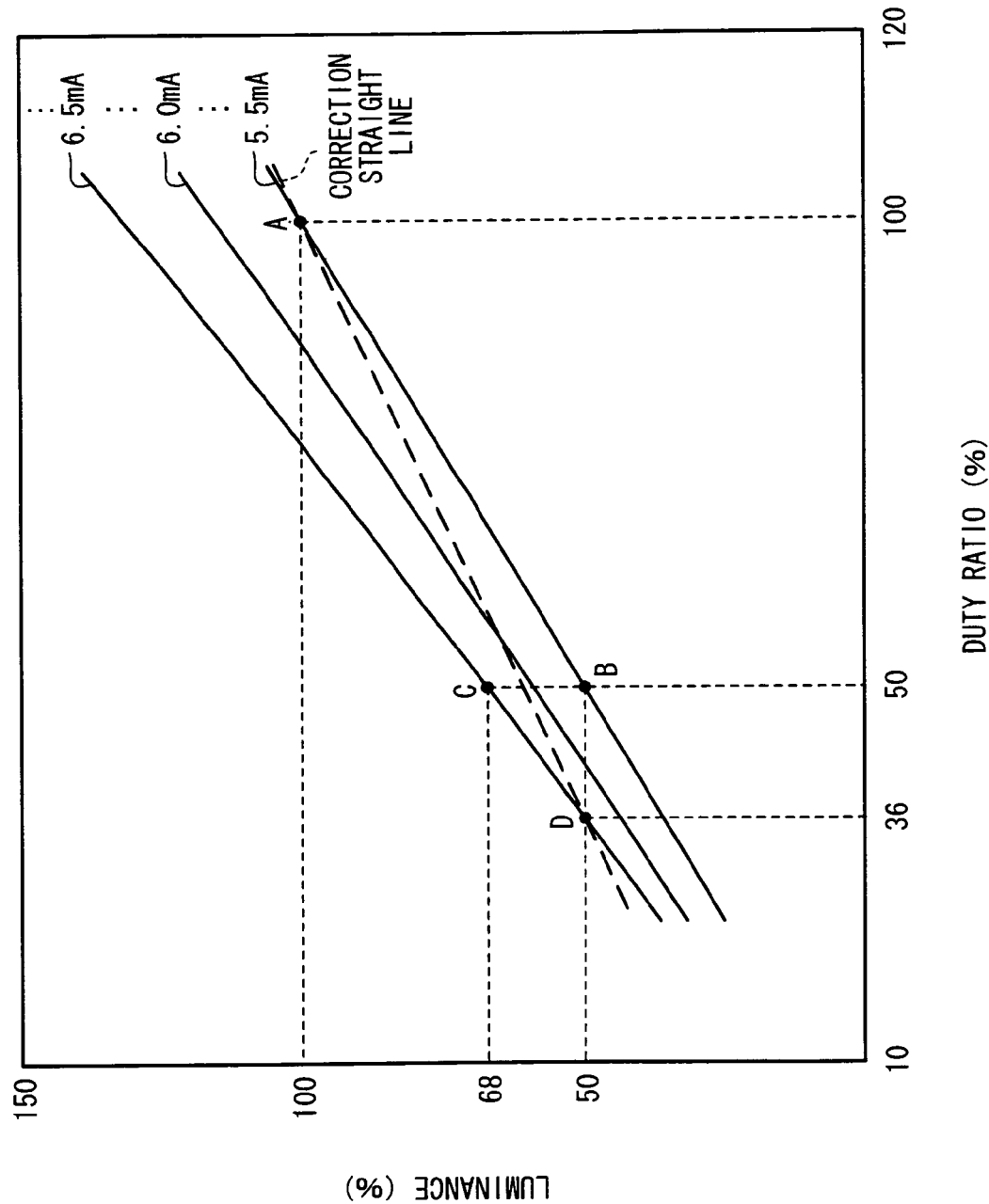
FIG. 6 is a graph showing a relationship between the duty ratio and the luminance, in accordance with a magnitude of the tube current.

First, the following description explains a relationship between the tube current flowing in the fluorescent lamp 25, the duty ratio, and the luminance. FIG. 6 is a graph showing a relationship between the duty ratio and the luminance, in accordance with a magnitude of the tube current.

As shown in FIG. 6, the luminance corresponding to brightness of the display screen of the liquid crystal panel 1 becomes greater as the duty ratio becomes greater, and also as the tube current flowing in the fluorescent lamp 25 becomes greater. Here, if the tube current becomes too large, a load on the fluorescent lamp 25 becomes large when a maximum luminance is displayed. This reduces the lifetime of the fluorescent lamp 25. For this reason, in consideration of the lifetime of the fluorescent lamp 25, it is preferable to set the value of the tube current for displaying the maximum luminance to be not more than 6.0 mA. In the display device of the present embodiment, in consideration of the lifetime of the fluorescent lamp 25, the value of the tube current for displaying the maximum luminance is set to be 5.5 mA.

In an arrangement of a display device adopting a conventional PWM light control method, the luminance is controlled by changing the duty ratio while the tube current flowing in the fluorescent lamp is maintained at a certain value, as shown by straight lines in FIG. 6.

Figure 7:
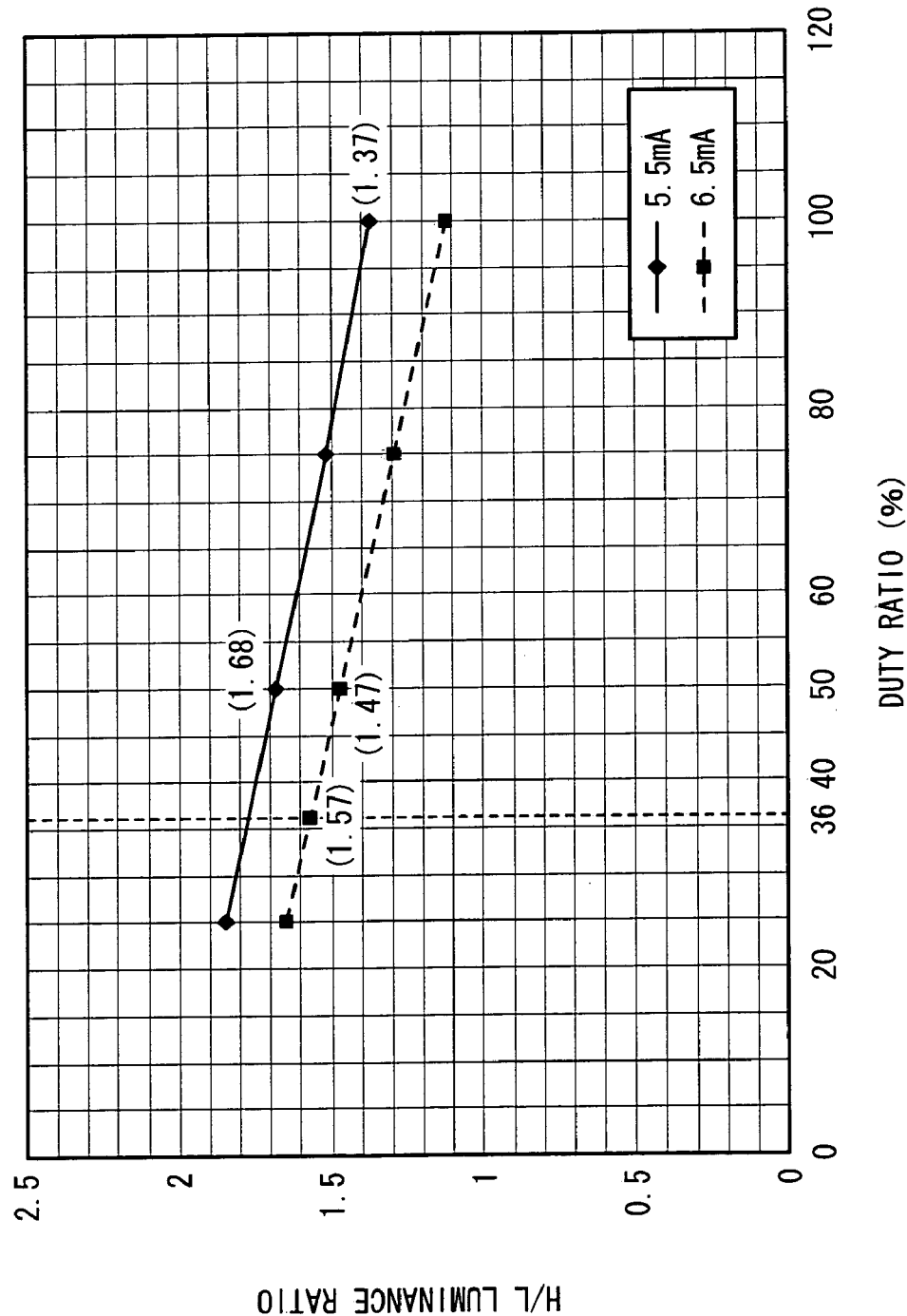
FIG. 7 is a graph showing a relationship between the duty ratio and the luminance ratio, in accordance with a magnitude of the tube current.

On the other hand, the display device of the present embodiment has such an arrangement that the tube current is changed in accordance with a change in the duty ratio. Specifically, for example, in a case where the value of the tube current is 5.5 mA, and the duty ratio is changed from 100% (point A) to 50% (point B), the luminance is changed from 100%, which is the maximum luminance, to 50%, which is substantially half of brightness of the maximum luminance. At this point, as shown in FIG. 7, the H/L luminance ratio is increased from 1.37 to 1.68, so that the difference between the left side and the right side on the display screen becomes significant. Therefore, the tube current flowing in the fluorescent lamp 25 is increased from 5.5 mA to 6.5 mA. This reduces the H/L luminance ratio from 1.68 to 1.47, as shown in FIGS. 5 and 7.

As such, in the case where the duty ratio is reduced from 100% to 50%, the H/L luminance ratio increases from 1.37 to 1.68. However, by increasing the value of the tube current from 5.5 mA to 6.5 mA, it is possible to reduce the H/L luminance ratio from 1.68 to 1.47. Accordingly, as compared with the conventional arrangement in which the H/L luminance ratio is 1.68 when the duty ratio is 50%, the H/L luminance ratio of the display device of the present embodiment is 1.47 when the duty ratio is 50%. Therefore, it is possible to reduce the difference in brightness between the right side and the left side on the display screen.

(Arrangement of Duty Correction Section 21a)

Meanwhile, although it is possible to reduce the H/L luminance ratio by increasing the value of the tube current flowing in the fluorescent lamp 25 when the duty ratio is set 50%, as described above, the luminance of the entire fluorescent lamp 25 simultaneously becomes greater. This causes the luminance of the entire display screen to be greater, so that the display becomes brighter than the target display. Specifically, as shown in FIG. 6, if the value of the tube current is increased from 5.5 mA to 6.5 mA when the duty ratio is 50%, the luminance is increased from 50% (point B) to 68% (point C), which is greater than a target luminance (50%).

Therefore, the display device of the present embodiment preferably includes the duty correction section 21a for correcting the duty ratio externally inputted into a duty ratio corresponding to the target luminance. The following description specifically explains an arrangement of the duty correction section 21a.

As shown in FIG. 6, first, the duty ratio is reduced from 100% (point A) to 50% (point B) so as to change the brightness of the display screen to substantially half of the brightness. Next, a value of a current supplied to the fluorescent lamp 25 is increased from 5.5 mA (point B) to 6.5 mA (point C), in order to realize uniform display by reducing the H/L luminance ratio. Because of this, the luminance becomes 68% (point C), which is greater than the target luminance (50%), as described above. Therefore, based on a relationship between the duty ratio and the luminance in a case where the value of the current supplied to the fluorescent lamp 25 is 6.5 mA, the duty ratio (50%) thus inputted is corrected to a duty ratio (36%; point D) corresponding to the target luminance (50%).

In a case where the duty ratio is reduced from 50% to 36% in order to cause the display screen to display the target luminance, which is substantially half (50%) of the maximum luminance (100%), the H/L luminance ratio becomes greater, as shown in FIGS. 5 and 7. Specifically, in a case where the duty ratio is reduced from 50% to 36% while the value of the tube current is 6.5 mA, the H/L luminance ratio is increased from 1.47 to 1.57. However, a degree that the H/L luminance ratio is reduced by the increase in the tube current is greater than a degree that the H/L luminance ratio is increased by the reduction in the duty ratio, so that it is possible to achieve a smaller H/L luminance ratio than the conventional arrangement, even in a case where the duty ratio is further reduced in accordance with an increase in the tube current. Specifically, it is possible to reduce the H/L luminance ratio from 1.68, which is a value obtained in the conventional arrangement, to 1.57.

Accordingly, it becomes possible to (i) reduce the difference in brightness between the right side and the left side on the display screen, and simultaneously (ii) cause the display screen to carry out display having the target brightness.

Here, the relationship between the duty ratio, the tube current flowing in the fluorescent lamp 25, and the luminance can be represented by a dashed line (hereinafter, referred to as "correction straight line") shown in FIG. 6. This relational expression satisfies (i) a condition where the duty ratio is 100% and the value of the tube current is 5.5 mA in a case where the maximum luminance (100%) is displayed, and (ii) another condition where the duty ratio is 36% and the value of the tube current is 6.5 mA in a case where the luminance of 50% of the maximum luminance is displayed.

Note that the duty ratio shown by the correction straight line is not the duty ratio (external duty ratio) externally inputted but the duty ratio (correction duty ratio) which is corrected in order to display the target luminance. Therefore, it is preferable to set the external duty ratio and the correction duty ratio in advance so that the external duty ratio and the correction duty ratio are associated with each other. The following description explains an example of a method of setting the external duty ratio and the correction duty ratio.

In the aforementioned example, the correction duty ratio is 36% in a case where the external duty ratio is 50%. Further, in consideration of the lifetime of the fluorescent lamp 25, the tube current flowing in the fluorescent lamp 25 is set such that the value of the tube current is 5.5 mA in a case of the maximum luminance. Accordingly, a correspondence relationship between the external duty ratio and the correction duty ratio can be calculated based on (i) a current characteristic (a characteristic of a current value of 5.5 mA) which intersects with the correction straight line at a point (point A) where the luminance becomes the maximum luminance, and (ii) the correction straight line.

Thus, the duty correction section 21a is arranged to calculate, based on the correction straight line, the correction duty ratio in accordance with the external duty ratio thus inputted.

Figure 8:
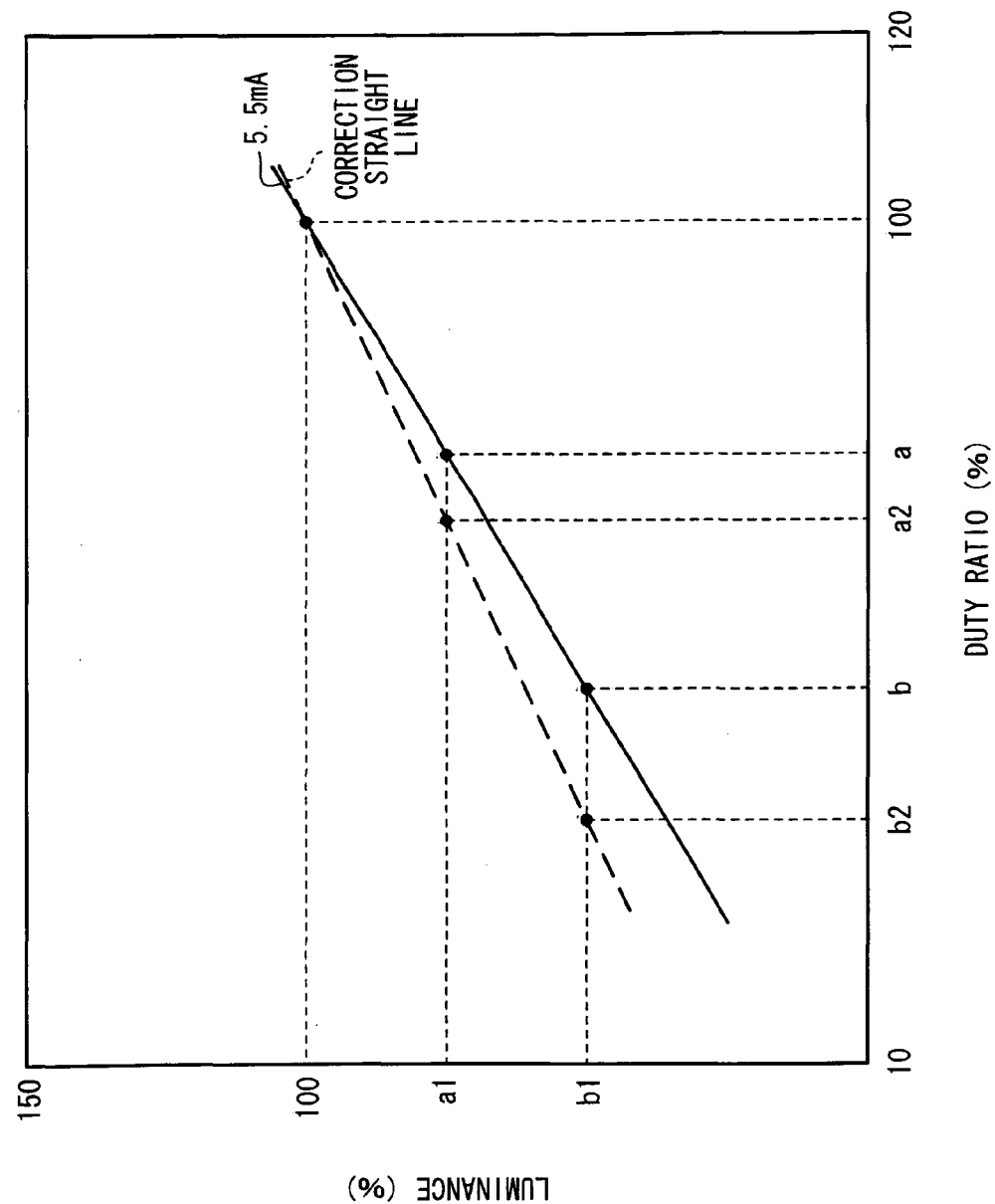
FIG. 8 is a graph showing a method of calculating a correction duty ratio, in accordance with an external duty ratio.

Here, FIG. 8 is a graph showing a method of calculating the correction duty ratio in accordance with the external duty ratio. For example, in a case where the external duty ratio is a %, a luminance corresponding to the external duty ratio a % is a 1%. Based on the correction straight line, a correction duty ratio a2% corresponding to the luminance of a1% can be found. In the same manner, in a case where the external duty ratio is b %, the correction duty ratio b2% can be found. With this method, it becomes possible to calculate the correction duty ratio which realize the target luminance, in accordance with the external duty ratio. By setting the correction duty ratios thus calculated and the external duty ratios in a table in advance, it becomes possible to obtain the duty ratio for displaying the target luminance, in accordance with the external duty ratio.

FIG. 9 illustrates the table which shows a correspondence relationship between the correction duty ratio and the current value, in each of the cases where (i) the external duty ratio is 100%, (ii) the external duty ratio is 67%, and (iii) the external duty ratio is 50%, as an example. On the basis of the correspondence relationship illustrated in FIG. 9, it becomes possible to display the target luminance in accordance with the duty ratio externally inputted.

The duty correction section 21a may store the table, and determine the correction duty ratio by looking up the table when the external duty ratio is inputted.

Figure 10:
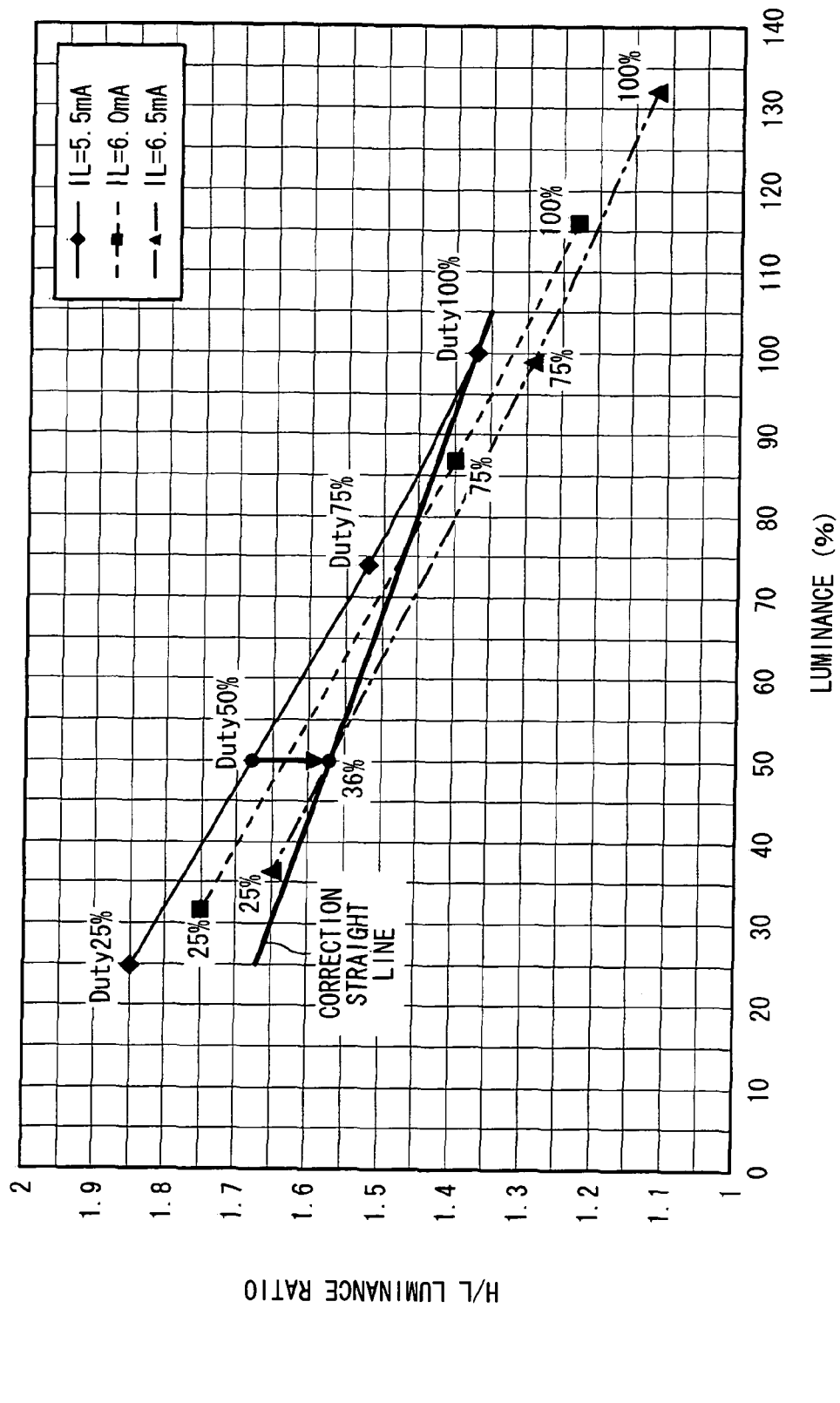
FIG. 10 is a graph in which each graph shown in FIG. 6 is associated with a relationship between the luminance and the H/L luminance ratio, showing the relationship between the luminance and the H/L luminance ratio, in accordance with a magnitude of the tube current flowing in the fluorescent lamp.

FIG. 10 is such a graph that each graph shown in FIG. 6 is associated with a relationship between the luminance and the H/L luminance ratio, showing the relationship between the luminance and the H/L luminance ratio in accordance with a magnitude of the tube current flowing in the fluorescent lamp 25. As shown in FIG. 10, first, in a case where the external duty ratio is 50%, the value of the tube current is increased from 5.5 mA to 6.5 mA. At this point, if the duty ratio is not changed, the H/L luminance ratio can be reduced from 1.68 to 1.47. However, the luminance simultaneously becomes 68% (see FIG. 6). Therefore, in order to cause the luminance to be identical with the target luminance (50%), the duty ratio is changed to 36%. In this case, the H/L luminance ratio becomes 1.57. This makes it possible to (i) reduce the H/L luminance ratio, and simultaneously (ii) cause the display screen to display the target luminance. Here, in the display device of the present embodiment, in consideration of the lifetime of the fluorescent lamp 25, the tube current is set to be 5.5 mA in a case where the maximum luminance is displayed, as described above. Further, as shown by the correction straight line shown in FIG. 10, the display device of the present embodiment has such an arrangement that the smaller the luminance (i.e. the duty ratio) becomes, the greater the tube current becomes. This makes it possible to, as compared with the conventional arrangement, (i) suppress the tube current at 5.5 mA in a case where the maximum luminance (100%) is displayed, and simultaneously (ii) causes the H/L luminance ratio to be smaller as the luminance becomes smaller.

(PWM Signal Generating Method)

Next, the following description explains a specific arrangement for generating a PWM signal satisfying the relationship between the correction duty ratio and the tube current flowing in the fluorescent lamp 25, along with the arrangement of the duty signal generating section 21.

Figure 11:
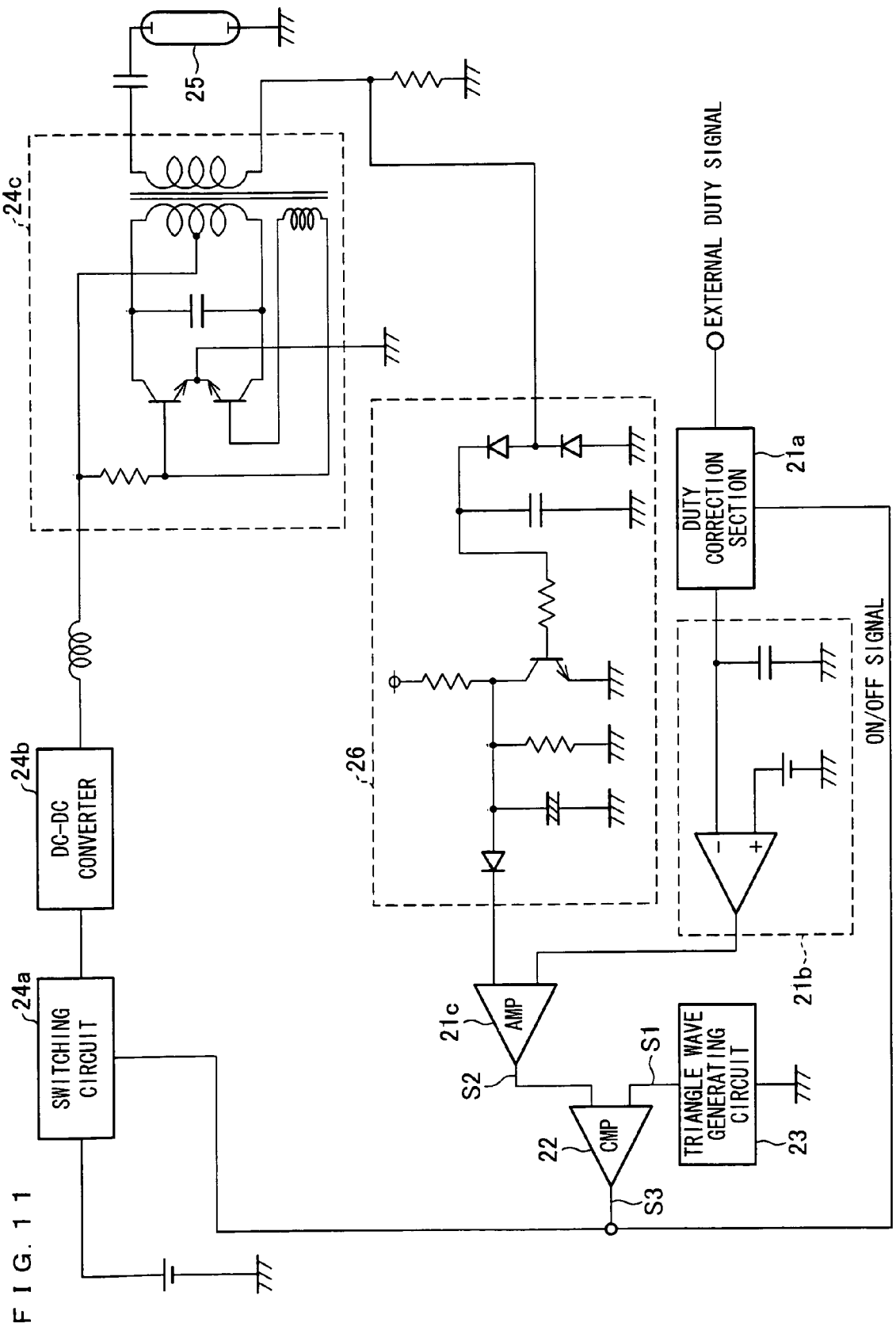
FIG. 11 is a circuit diagram schematically illustrating an arrangement of a backlight device illustrated in FIG. 1.

FIG. 11 is a circuit diagram schematically illustrating an arrangement of the backlight device 2 illustrated in FIG. 1.

First, the following description explains an arrangement for generating the current flowing in the fluorescent lamp 25, in accordance with a duty signal (external duty signal) externally inputted.

The duty correction section 21a corrects the external duty signal into a desired duty signal by the method described above (see FIGS. 8 and 9), and outputs the duty signal thus corrected to the voltage generating section 21b. Further, the duty correction section 21a outputs an ON/OFF signal corresponding to the duty signal thus corrected, to the PWM signal generating section 22.

The voltage generating section 21b is a circuit for generating a voltage corresponding to the duty signal thus inputted, and can be constituted by a differential amplifier. As illustrated in FIG. 11, a difference between a reference voltage and the duty signal is amplified, so that (i) in a case where the duty signal is reduced, an output voltage becomes greater, and (ii) in a case where the duty signal is increased, the output voltage becomes less. Here, the duty signal inputted into the voltage generating section 21b is a signal calculated based on the relationship shown in FIGS. 8 and 9, that is, the signal generated such that the external duty signal is corrected in order to realize the target luminance. Specifically, for example, in a case where the external duty ratio is set to be 50%, a duty signal of 36% is inputted into the voltage generating section 21b. This allows the voltage generating section 21b to generate a voltage having a desired magnitude, in accordance with the external duty signal.

The current amplifying section 21c is am amplifier circuit for amplifying the tube current flowing in the fluorescent lamp 25, which tube current is detected by the tube current detecting section 26, to a current value corresponding to the duty ratio thus inputted. As illustrated in FIG. 11, the tube current detected by the tube current detecting section 26 and the voltage outputted from the voltage generating section 21b are inputted into the current amplifying section 21c, so that it is possible to amplify the tube current detected by the tube current detecting section 26, to the current value corresponding to the voltage outputted from the voltage generating section 21b.

The PWM signal generating section 22 is constituted by a comparator. The PWM signal generating section 22 compares a triangle wave signal outputted from the triangle wave generating circuit 23 with a signal (current value) outputted from the current amplifying section 21c, and outputs a pulse signal corresponding to (i) a result of the comparison, and (ii) an ON/OFF signal which corresponds to the duty ratio corrected by the duty correction section 21a.

With the arrangement, it is possible to generate the PWM signal for displaying the target luminance, in accordance with the external duty signal.

Figure 12:
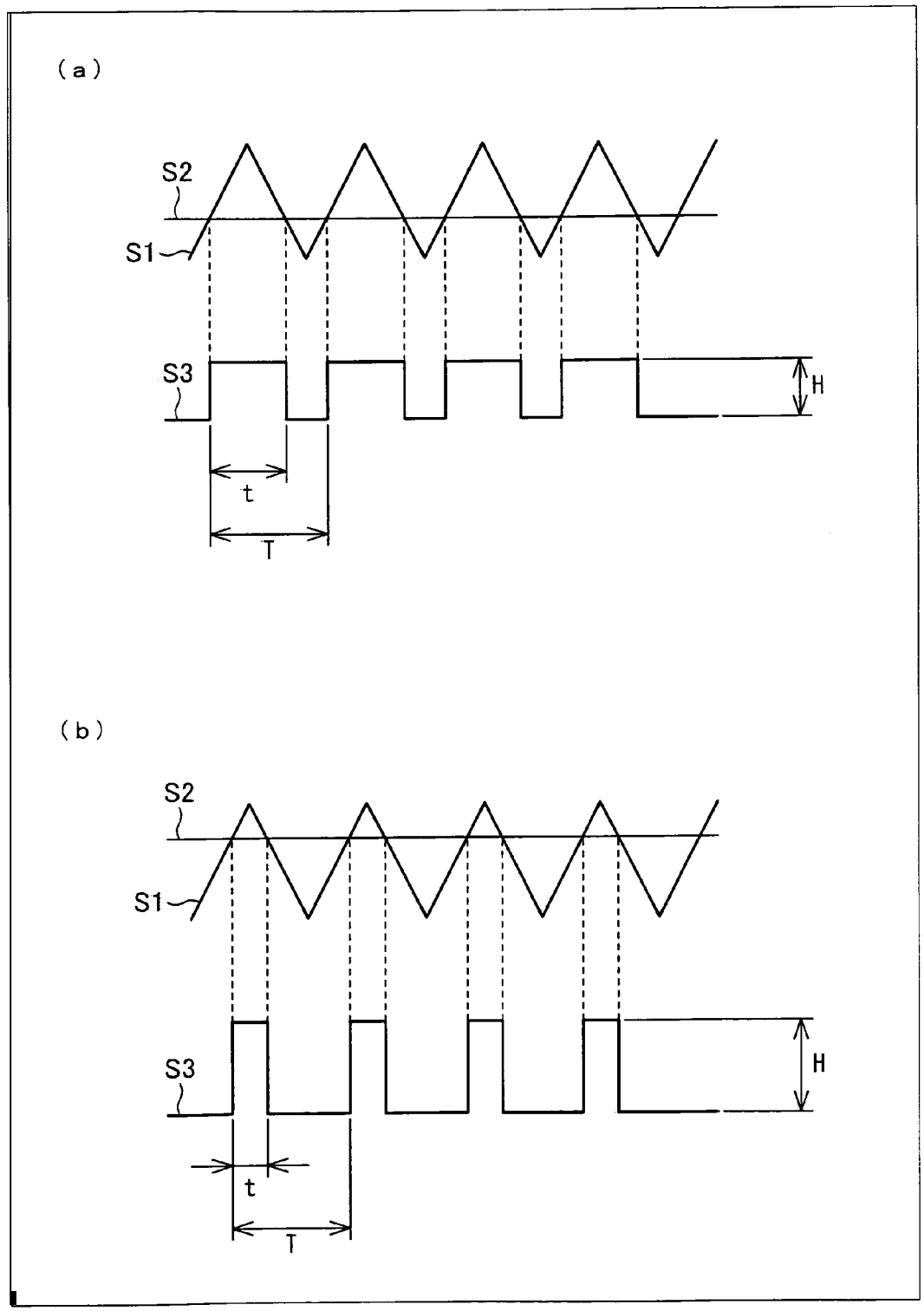
FIG. 12 is a view schematically illustrating an output waveform of each of: a triangle wave generating circuit; a current amplifying section; and a PWM signal generating section ((a) of FIG. 12 shows a case where the external duty ratio is set to be 67%, and (b) of FIG. 12 shows a case where the external duty ratio is set to be 50%).

Here, the following description explains a specific example with reference to FIG. 12. FIG. 12 is a view schematically illustrating each of output waveforms of the triangle wave generating circuit 23, the current amplifying section 21c, and the PWM signal generating section 22. (a) of FIG. 12 shows a case where the external duty ratio is set to be 67%, and (b) of FIG. 12 shows a case where the external duty ratio is set to be 50%. In FIG. 12, S1 is an output voltage of the triangle wave generating circuit 23, S2 is an output voltage of the current amplifying section 21c, and S3 is an output voltage of the PWM signal generating section 22. The following description explains a case where the external duty ratio is reduced from 67% to 50%, as an example. Note that a value of the external duty ratio and a value of the luminance can be expressed at the same ratio. For example, in a case where the external duty ratio is 100% (where the maximum luminance is displayed), the luminance is 100%, and in a case where the external duty ratio is 50% (where half of brightness of the maximum luminance is displayed), the luminance is 50%.

First, in a case where the external duty ratio is set to be 67%, a duty signal of 57% is inputted into the voltage generating section 21b by looking up the table illustrated in FIG. 9, for example. The voltage generating section 21b outputs a voltage corresponding to the duty signal. Note that this voltage corresponds to a current value (6.0 mA, in this case) set in the table. Next, the current amplifying section 21c amplifies the value of the tube current flowing in the fluorescent lamp 25, to 6.0 mA, based on the voltage outputted from the voltage generating section 21b. Then, the PWM signal generating section 22 generates a pulse signal S3 (see (a) of FIG. 12) based on an output signal S2 of 6.0 mA, a triangle wave signal S1, and an ON/OFF signal corresponding to the duty signal of 57%. This allows the liquid crystal panel 1 to display the luminance of 67%.

Next, in a case where the external duty ratio is reduced from 67% to 50%, a duty signal of 36% is inputted into the voltage generating section 21b by looking up the table illustrated in FIG. 9. The voltage generating section 21b outputs a voltage corresponding to the duty signal. Note that this voltage corresponds to a current value (6.5 mA, in this case) set in the table. Next, the current amplifying section 21c amplifies the value of the tube current flowing in the fluorescent lamp 25m, to 6.5 mA, based on the voltage outputted from the voltage generating section 21b. Then, the PWM signal generating section 22 generates a pulse signal S3 (see (b) of FIG. 12) based on an output signal S2 of 6.5 mA, a triangle wave signal S1, and an ON/OFF signal corresponding to the duty signal of 36%. This allows the liquid crystal panel 1 to display the luminance of 50%.

(Modified Example of Voltage Generating Section 21b)

Figure 13:
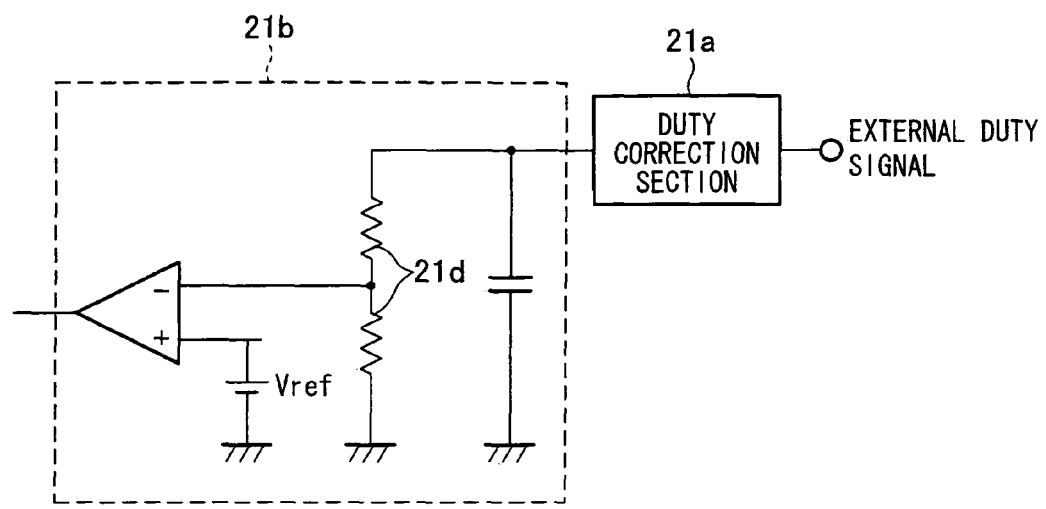
FIG. 13 is a circuit diagram illustrating another arrangement of a voltage generating section.

Here, the following description explains another arrangement of the voltage generating section 21b. FIG. 13 is a circuit diagram illustrating another arrangement of the voltage generating section 21b. In addition to the arrangement illustrated in FIG. 11, the voltage generating section 21b of this example further includes a resistance dividing section 21d. This makes it possible to adjust a range of the voltage generated based on the duty signal inputted into the voltage generating section 21b.

Here, in the PWM light control method, the display device is arranged to rise less quickly so as to prevent generation of sounds due to vibration of the transformer, or the like, when the display device is turned from an OFF state into an ON state. Therefore, a minimum value of the duty ratio is, generally, set to be in a range of 10% to 30%. As described above, since the minimum value of the duty ratio is limited, in a case where the luminance is required to be less than such a value, it is necessary to reduce a current amplitude of the tube current.

Figure 14:
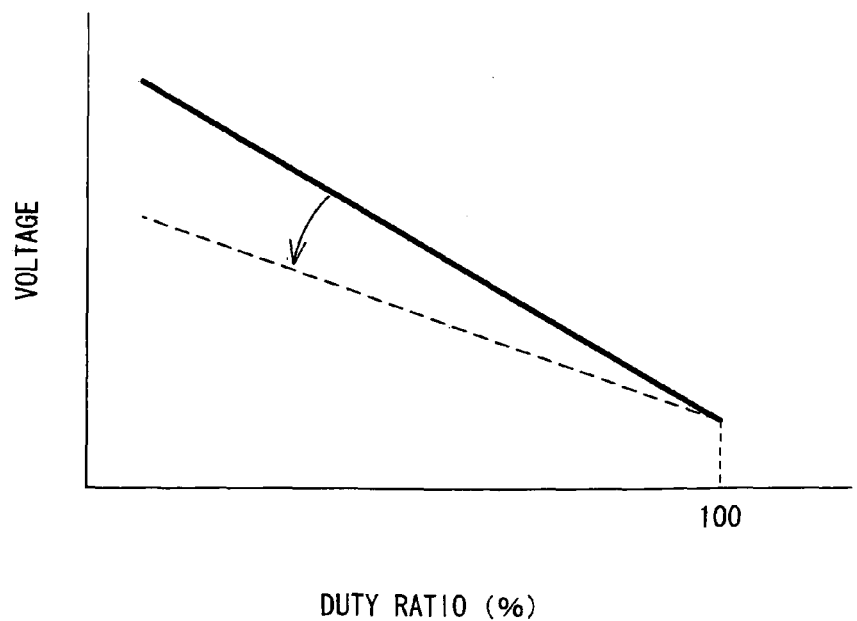
FIG. 14 is a graph showing a relationship between the duty ratio and an output voltage of the voltage generating section.
Figure 15:
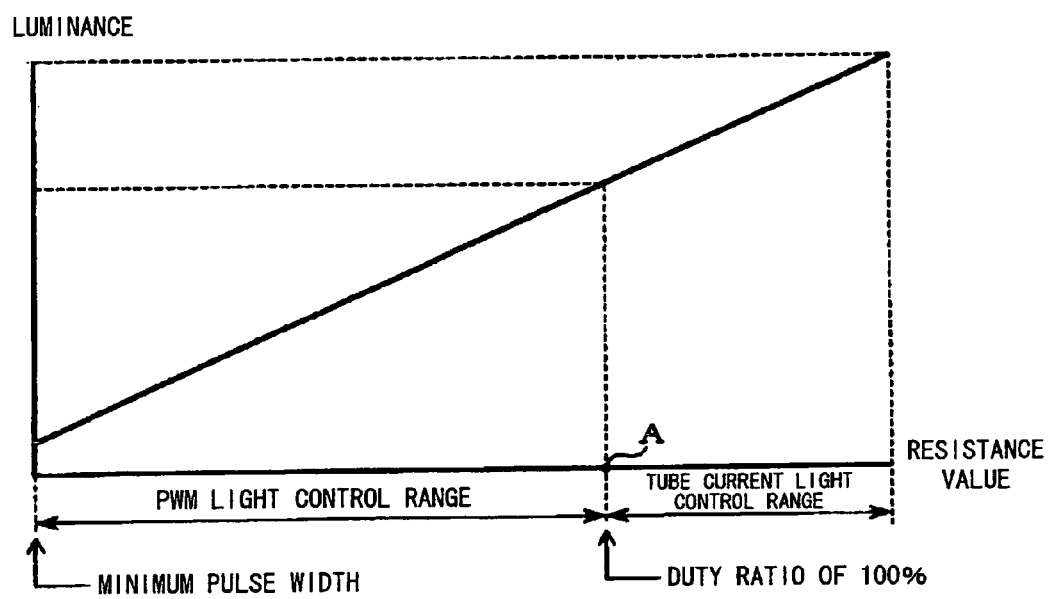
FIG. 15 is a graph showing a change in luminance in a conventional backlight device.

In this point of view, with the arrangement illustrated in FIG. 13, it is possible to change inclination of a straight line showing the relationship between the duty ratio and the output voltage of the voltage generating section 21b, as shown in FIG. 14. Thereby, it becomes possible to adjust the range of the luminance. For example, in order to cause the minimum luminance to be darker, the voltage corresponding to the duty ratio is set so as to cause the straight line to be less inclined. Further, in a case where the minimum luminance is not required to be much darker, the voltage corresponding to the duty ratio is set so as to cause the straight line to be more inclined.

Furthermore, it is possible to have an arrangement in which (i) the inclination of the straight line is set constant in a range down to the minimum value of the duty ratio, and (ii) in a case where the luminance is required to be less than the minimum value of the duty ratio, the current amplitude of the tube current is reduced while the minimum value of the duty ratio is maintained.

Moreover, in a case where a dark luminance state is often required (in the Europe, for example), it is possible to have an arrangement in which (i) the current amplitude is maintained constant in a range from the duty ratio of 100% to a certain duty ratio, and (ii) in a case where the duty ratio becomes less than the certain duty ratio, the current amplitude is increased.

The present invention is not limited to the description of the embodiments above, but may be altered by a skilled person within the scope of the claims. An embodiment based on a proper combination of technical means disclosed in different embodiments is encompassed in the technical scope of the present invention.

As described above, a backlight lamp lighting control device of the present invention includes the PWM signal generating section which generates the PWM signal based on a current, which is obtained by adjusting the current detected by the tube current detecting section in accordance with the duty ratio externally inputted, so that luminance displayed on a display panel will be substantially uniform over the entire display panel.

With this arrangement, it is possible to adjust the current flowing in the lamp in accordance with a change in duty ratio. Accordingly, it is possible to cause luminance to be substantially uniform over the entire display screen by reducing a luminance difference generated in the lamp. Therefore, by reducing the difference between the luminance on the high voltage side and the luminance on the low voltage side in the lamp of the backlight, it is possible to provide a backlight lamp lighting control device which can realize substantially uniform luminance of display over an entire display screen.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A backlight lamp lighting control device of the present invention can reduce a luminance difference generated on a display screen, by adjusting a current flowing in a lamp in accordance with a duty ratio. Therefore, the backlight lamp lighting control device of the present invention is applicable to a backlight device for, for example, a liquid crystal display device.

The invention claimed is:

1. A backlight lamp lighting control device comprising:
a pulse width modulation (PWM) signal generating section for generating a PWM signal in accordance with a duty ratio externally inputted, and outputting the PWM signal to a PWM inverter for driving a lamp to light;
a tube current detecting section for detecting a current flowing in the lamp,
the PWM signal generating section generating the PWM signal based on a current, which is obtained by adjusting the current detected by the tube current detecting section in accordance with the duty ratio externally inputted, so that luminance displayed on a display panel will be substantially uniform over the entire display panel, and
the current flowing in the lamp being adjusted in accordance with a change in the duty ratio externally inputted; and
a duty correction section for correcting the duty ratio externally inputted, in accordance with the current thus adjusted, so that the luminance displayed on the display panel will be identical with luminance corresponding to the duty ratio externally inputted,
the PWM signal being generated based on the current thus adjusted and the duty ratio thus corrected,
wherein the amount by which a luminance ratio of the lamp is reduced by an increase in the current flowing in the lamp is greater than the amount by which the luminance ratio of the lamp increases due to a reduction in the duty ratio externally inputted, the luminance ratio of the lamp being defined as a luminance on a high voltage side of the lamp divided by a luminance on a low voltage side of the lamp.

2. The backlight lamp lighting control device according to claim 1, further comprising:
a voltage generating section for outputting a desired voltage in accordance with the duty ratio externally inputted; and
a current amplifying section for (i) amplifying the current detected by the tube current detecting section, based on the voltage outputted from the voltage generating section, and (ii) outputting the current thus amplified, to the PWM signal generating section.

3. The backlight lamp lighting control device according to claim 1, wherein:
the duty correction section stores a table in which currents thus adjusted and duty ratios thus corrected are associated with each other in advance; and
the table is looked up to cause the luminance displayed on the display panel to be identical with the luminance corresponding to the duty ratio externally inputted.

4. The backlight lamp lighting control device according to claim 3, wherein the duty correction section looks up the table so as to determine a duty ratio corresponding to the duty ratio externally inputted, as the duty ratio thus corrected.

5. The backlight lamp lighting control device according to claim 3, further comprising:
a voltage generating section for (i) generating a voltage in accordance with the duty ratio thus corrected, which is determined in accordance with the duty ratio externally inputted by looking up the table, and (ii) outputting the voltage, wherein the voltage is a voltage for amplifying the current detected by the tube current detecting section to the current thus adjusted; and
a current amplifying section for (i) amplifying the current detected by the tube current detecting section to the current thus adjusted, based on the voltage outputted from the voltage generating section, and (ii) outputting to the PWM signal generating section the current thus adjusted.

6. A display device including a display panel and a backlight device for lighting the display panel,
the backlight device comprising a backlight lamp lighting control device recited in claim 1.

7. The backlight lamp lighting control device according to claim 4, further comprising:
a voltage generating section for (i) generating a voltage in accordance with the duty ratio thus corrected, which is determined in accordance with the duty ratio externally inputted by looking up the table, and (ii) outputting the voltage, wherein the voltage is a voltage for amplifying the current detected by the tube current detecting section to the current thus adjusted; and
a current amplifying section for (i) amplifying the current detected by the tube current detecting section to the current thus adjusted, based on the voltage outputted from the voltage generating section, and (ii) outputting to the PWM signal generating section the current thus adjusted.

* * * * *